United States Patent
Delger

(10) Patent No.: US 10,654,388 B2
(45) Date of Patent: May 19, 2020

(54) ARTICULATING MULTI-BODY SYSTEM WITH A DISPLACEMENT CLUTCH

(71) Applicant: KA Group AG, Zürich (CH)

(72) Inventor: Ben Delger, Hazel Park, MI (US)

(73) Assignee: KA GROUP AG, Zürich (CH)

( * ) Notice: Subject to any disclaimer, the term of this patent is extended or adjusted under 35 U.S.C. 154(b) by 42 days.

(21) Appl. No.: 16/035,066

(22) Filed: Jul. 13, 2018

(65) Prior Publication Data

US 2020/0017008 A1  Jan. 16, 2020

(51) Int. Cl.
*B60N 2/75* (2018.01)

(52) U.S. Cl.
CPC ............ *B60N 2/767* (2018.02); *B60N 2/753* (2018.02)

(58) Field of Classification Search
CPC . B60N 2/753; B60N 2/767; F16C 1/10; F16C 1/106; F16C 1/12; F16C 1/14; F16C 1/18
USPC ...... 242/388.8, 378, 378.4; 296/187.01, 1.09
See application file for complete search history.

(56) References Cited

U.S. PATENT DOCUMENTS

| | | | | |
|---|---|---|---|---|
| 2,904,272 A * | 9/1959 | Barrett | ................... | H01Q 1/103 242/390.1 |
| 3,403,578 A * | 10/1968 | Morse | .................. | B63H 21/265 74/500.5 |
| 7,249,727 B2 * | 7/2007 | Kovacevich | ....... | A41D 13/0518 242/388.1 |
| 7,516,914 B2 * | 4/2009 | Kovacevich | ............. | A42B 3/08 242/388.8 |
| 7,896,787 B2 * | 3/2011 | Lasala | ................. | A61H 15/0092 482/121 |
| 8,939,925 B2 * | 1/2015 | Ingimundarson | .......... | A41F 1/04 602/19 |
| 8,984,671 B2 * | 3/2015 | Yasuda | .............. | G02B 27/0176 2/417 |
| 9,629,417 B2 * | 4/2017 | Cavanagh | ............ | A43C 11/165 |
| 9,706,814 B2 * | 7/2017 | Converse | ................ | A61F 5/028 |
| 9,737,115 B2 * | 8/2017 | Soderberg | .............. | A43C 1/003 |
| 10,251,451 B2 * | 4/2019 | Converse | ............. | A43C 11/165 |
| 10,477,924 B2 * | 11/2019 | Midorikawa | .......... | A43C 11/20 |
| 2019/0368237 A1 * | 12/2019 | Distefano | ................. | F16C 1/12 |

* cited by examiner

*Primary Examiner* — Hilary L Gutman
(74) *Attorney, Agent, or Firm* — Cantor Colburn LLP

(57) ABSTRACT

An articulating multi-body system includes first, second and third bodies, and a displacement clutch. The clutch is mounted to the second body, and includes first and second spools, and first and second cables. The first and second spools include respective first and second mating threads centered about the centerline. The first and second spools are each adapted to rotate about the centerline between fully spooled states, mid-states, and unspooled states. The first and second cables extend between, and are connected to, the respective first and third bodies and the respective first and second spools for cable spooling. A maximum axial distance exists between the first and second spools when in the fully spooled states, and the first and second spools make axial contact with one-another when one is in the fully spooled state and the other is in the unspooled state.

18 Claims, 2 Drawing Sheets

ARTICULATING MULTI-BODY SYSTEM WITH A DISPLACEMENT CLUTCH

INTRODUCTION

The subject disclosure relates to an articulating multi-body system, and more particularly, to the articulating multi-body system having a displacement clutch.

Many articulating mechanisms include a multitude of bodies that must move in relationship to one-another. Such movement may be in a particular pre-defined direction, but with restricted displacement depending upon the present position(s) of other bodies of the mechanism. Limiting such displacement typically involves displacement devices that can be complicated and require many interfacing components contributing toward material and manufacturing costs, negatively impacting robustness, and complicating user operation.

Accordingly, it is desirable to provide articulating multi-body systems that may optimize robustness, reduce costs, and operate in an efficient and easy to handle manner.

SUMMARY

In one exemplary embodiment an articulating multi-body system includes a first body, a second body, a third body, and a displacement clutch mounted to the second body. The displacement clutch includes first and second spools, and first and second cables. The first spool has first threads centered about a centerline, and is adapted to rotate about the centerline between a fully spooled state, a mid-state, and an unspooled state. The second spool includes second threads centered about the centerline and operably threaded to the first threads for axial displacement with respect to the first spool. The second spool is adapted to rotate about the centerline between a fully spooled state, a mid-state, and an unspooled state. The first cable extends between, and is connected to, the first body and the first spool. The first cable is adapted to spool about the first spool. The second cable extends between, and is connected to, the third body and the second spool. The second cable is adapted to spool about the second spool. A maximum axial distance exists between the first and second spools when the first and second spools are in the fully spooled states. The first and second spools make axial contact with one-another when one of the first and second spools is in the fully spooled state, and the other of the first and second spools is in the unspooled state.

In addition to one or more of the features described herein, the displacement clutch includes a torsion spring connected to the first and second spools, wherein the torsion spring is in a fully torqued condition when the first and second spools are in axial contact, and is in a fully relaxed condition when the first and second spools are spaced at the maximum axial distance.

In addition to one or more of the features described herein, the first body is an armrest, the second body is a console, and the third body is a stationary structure.

In addition to one or more of the features described herein, the first body is an armrest, the second body is a console, and the third body is a stationary structure.

In addition to one or more of the features described herein, the first and second spools are in axial contact with one-another when the first and second spools are in the mid-states.

In addition to one or more of the features described herein, the first cable is fully extended when the first spool is in the unspooled state, and the second cable is fully extended when the second spool is in the unspooled state.

In addition to one or more of the features described herein, the first threads are female threads and the second threads are male threads.

In addition to one or more of the features described herein, the articulating multi-body system includes a fourth body. The displacement clutch includes a third spool and a third cable. The third spool has third threads centered about the centerline and operably threaded to one of the first and second spools for axial displacement with respect to the one of the first and second spools. The third spool is adapted to rotate about the centerline between a fully spooled state, a mid-state, and an unspooled state. The third cable extends between, and is connected to, the fourth body and the third spool, and spools about the third spool.

In addition to one or more of the features described herein, the second spool is disposed axially between the first and third spools.

In addition to one or more of the features described herein, the first and second threads are left-handed threads and the third threads are right-handed threads.

In another exemplary embodiment, a displacement clutch is adapted to control motion between first, second, and third bodies. The displacement clutch includes a first spool, a second spool, a first cable, and a second cable. The first spool is adapted to rotationally engage the second body, and includes first threads centered about a centerline. The first spool is adapted to rotate about the centerline between a fully spooled state, a mid-state, and an unspooled state. The second spool rotationally engages to the second body, and includes second threads centered about the centerline and operably threaded to the first threads for axial displacement with respect to the first spool. The second spool is adapted to rotate about the centerline between a fully spooled state, a mid-state, and an unspooled state. The first cable extends between, and is connected to, the first body and the first spool, and is adapted to spool about the first spool. The second cable extends between, and is connected to, the third body and the second spool, and is adapted to spool about the second spool. A maximum axial distance exists between the first and second spools when the first and second spools are in the fully spooled states. The first and second spools make axial contact with one-another when one of the first and second spools in the fully spooled state and the other of the first and second spools is in the unspooled state.

In addition to one or more of the features described herein, the first and second spools are in axial contact with one-another when the first and second spools are in the mid-states.

In addition to one or more of the features described herein, the displacement clutch includes a torsion spring connected to the first and second spools. The torsion spring is in a maximum torqued condition when one of the first and second spools are in axial contact.

In addition to one or more of the features described herein, the first cable is fully extended when the first spool is in the unspooled state, and the second cable is fully extended when the second spool is in the unspooled state.

In addition to one or more of the features described herein, the first threads are female threads and the second threads are male threads.

In addition to one or more of the features described herein, the displacement clutch includes a third spool having third threads centered about the centerline and operably threaded to one of the first and second spools for axial displacement with respect to the one of the first and second spools. The third spool is adapted to rotate about the centerline between a fully spooled state, a mid-state, and an unspooled state. The third cable extends between, and is connected to, a fourth body and the third spool, and is adapted to spool about the third spool.

In addition to one or more of the features described herein, the second spool is disposed axially between the first and third spools.

In addition to one or more of the features described herein, the first and second threads are left-handed threads and the third threads are right-handed threads.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
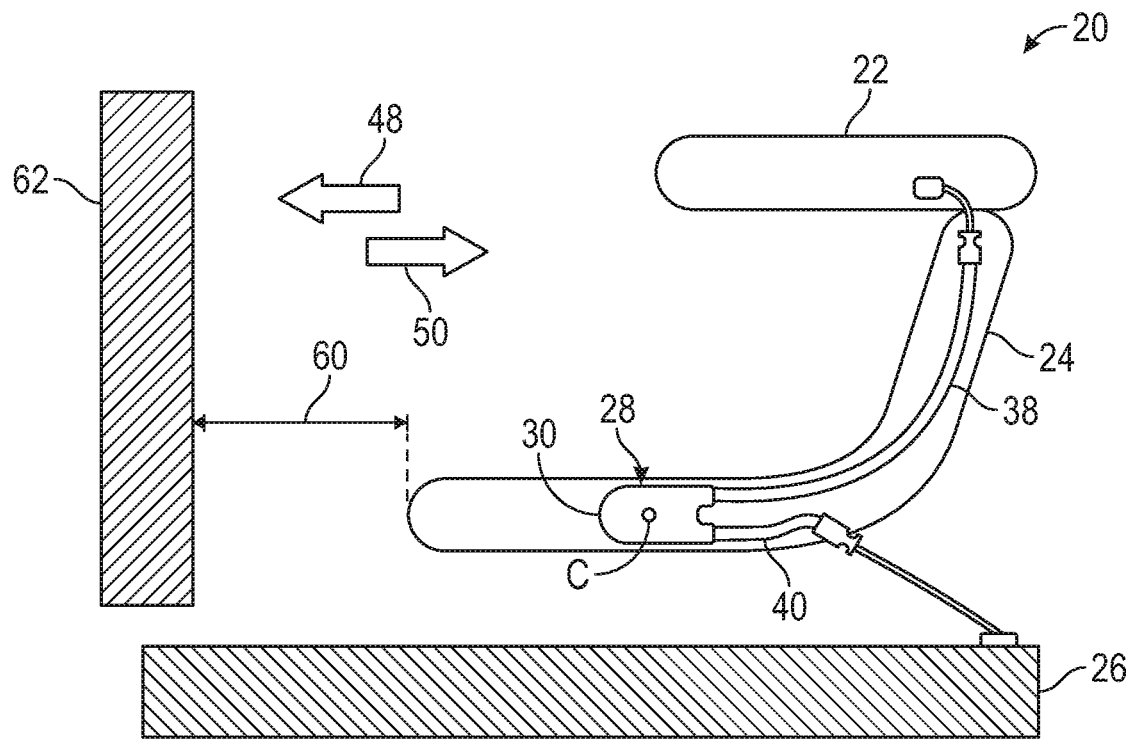
FIG. 1 is a schematic of an articulating multi-body system as one, non-limiting, exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 illustrates an articulating multi-body system 20 that may include a plurality of bodies (i.e., three illustrated as 22, 24, 26) and a displacement clutch 28. The bodies 22, 24, 26 may be interconnected to one another, thus restricting movement of the bodies with respect to one-another along predefined paths. The displacement clutch 28 is interconnected to the bodies 22, 24, 26 to limit displacement (i.e., distance) of the movement. More specifically, the placement, or position, of one body may limit, or constrain, the displacement of one, or more, other bodies. In one example, the first body 22 may be an armrest for a vehicle, the second body 24 may be a console (e.g., center console) operably engaged to the armrest, and the third body 26 may be a stationary structure (e.g., vehicle chassis) operably engaged to the console. In another application, the system 20 may be part of an articulating vehicle seat with the bodies 22, 24, 26 being different portions of the seat (e.g., headrest, seat back, seat base, etc.).

Figure 2:
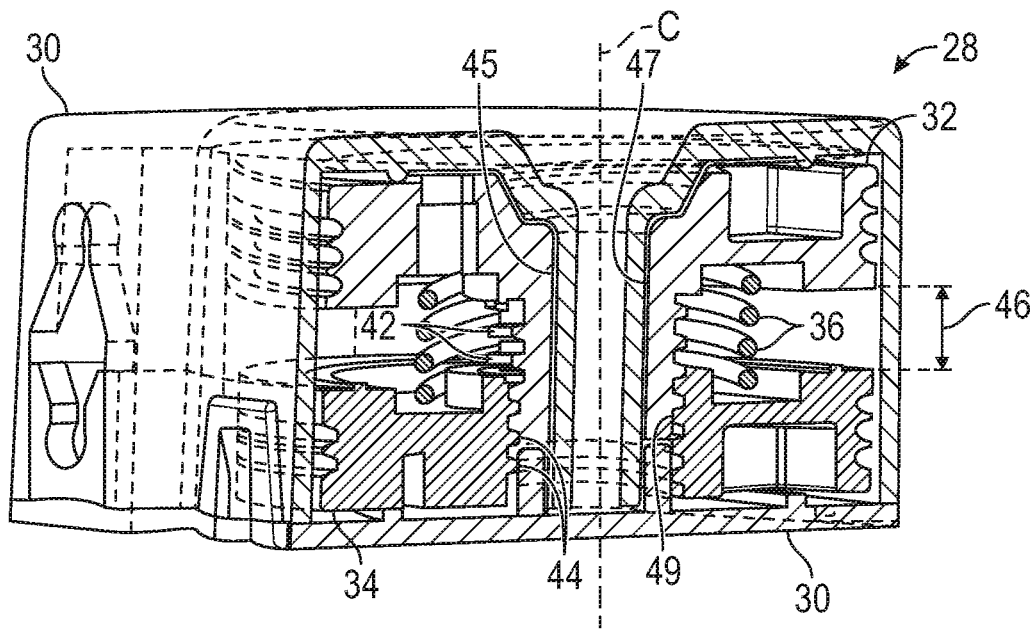
FIG. 2 is a perspective cross section of a displacement clutch of the articulating multi-body system with first and second spools both in fully spooled states.

Referring to FIGS. 1 and 2, the displacement clutch 28 may include a housing 30, a first spool 32, a second spool 34, a resilient biasing member, or torsion spring, 36, a first cable 38, and a second cable 40. The first and second spools 32, 34 may be rotationally mounted to, and generally within, the housing 30 for rotation about a common centerline "C". The first and second spools 32, 34 include respective threads 42, 44, both centered about the centerline "C" and adapted to thread, or mate, with one-another. In operation, as one spool rotates about the centerline "C" with respect to the other spool, an axial distance between the spools 32, 34 will change via the threading action. As illustrated, the threads 42 of spool 32 are male threads, and the threads 44 of spool 34 are female threads for receipt of the male threads 42. However, in another embodiment, the threads 42 may be female threads and the threads 44 may be male threads. In one example, the cables 38, 40 are Bowden cables.

To enable axial displacement of either, or both, of the spools 32, 34, the housing 30 may include an axle portion 45 that is concentric to the centerline "C". The spools 32, 34 may each define through-bores 47, 49 concentrically located with respect to the centerline "C". In one embodiment, the through-bore 47 is located radially inward from the male threads 42, and the female threads 44 of the spool 34 generally define the through-bore 49. When the clutch 28 is fully assembled, the axle portion 45 extends through the through-bores 47, 49, so that the spools 32, 34 ride axially along the axle portion 45.

In one embodiment, the housing 30 is rigidly mounted to the second body 24. The torsion spring 36 may be generally located axially between the spools 32, 34, extending between and attached to the spools 32, 34, and centered about the centerline "C". The cable 38 extends between and is attached to the spool 32 and the body 22. The cable 40 extends between, and is attached to, the spool 34, and the body 26. In another embodiment, the spools 32, 34 may be directly, rotationally, mounted to the body 24.

Figure 3:
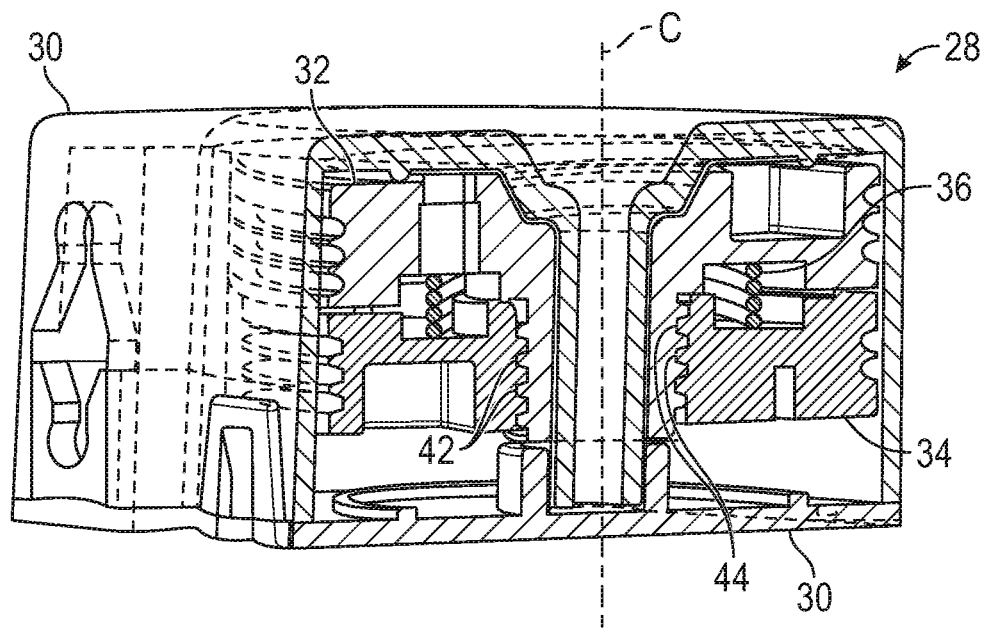
FIG. 3 is a perspective cross section of the displacement clutch with the first spool in the fully spooled state and the second spool in a fully unspooled state.

In operation, the spool 32 is adapted to rotate about the centerline "C" between a fully spooled state (see FIG. 2), a mid-state (not shown), and an unspooled state (not shown). Likewise, the spool 34 is adapted to rotate about the centerline "C" between a fully spooled state (see FIG. 2), a mid-state (not shown), and an unspooled state (see FIG. 3). With the spool 32 in the fully spooled state, the cable 38 is retracted and fully wound about the spool 32, and with the spool 32 in the unspooled state the cable 38 is fully extended. Similarly, with the spool 34 in the fully spooled state, the cable 40 is retracted and fully wound about the spool 34, and with the spool 34 in the unspooled state the cable 40 is fully extracted (i.e., extended).

In one embodiment, the torsion spring 36 is adapted to bias the spools 32, 34 toward the spooled states with the cables 38, 40 thus retracted. With the cables 38, 40 retracted, the torsion spring 36 is in a fully relaxed condition (i.e., minimal torsion) and the spools 32, 34 are at a maximum axial distance (see arrow 46 in FIG. 2) from one-another. When, for example, the spool 32 is in the fully spooled state with the associated cable 38 retracted, and the spool 34 is in the fully unspooled state with the associated cable 40 extended (see FIG. 3), the torsion spring 36 is in the fully torqued condition and the spools 32, 34 are in axial contact with one another. This axial contact acts to limit the displacement between the bodies 22, 24, 26. In other operating scenarios, the torsion spring 36 is also in the fully torqued condition if the spool 34 is in the fully spooled state and the spool 32 is in the fully unspooled state. Likewise, if both spools 32, 34 are in the mid-state, the respective cables 38, 40 are about half extracted, the spools 32, 34 are in axial contact (i.e., the threads are unable to thread any further), and the torsion spring 36 is in the fully torqued condition. In one example, the spools 32, 34 have substantially equal diameters, thus the amount one cable can extract is about proportional to the amount the other cable is retracted.

In one embodiment, the fully spooled states of the spools 32, 34 may be indexed by the axial abutment of the spools 32, 34 against the housing 30 or other physical stop. Specifically, FIG. 2 displays spool 34 axially abutted against the housing 30 when in the fully spooled state, and FIG. 3 displays spool 32 axially abutted against the housing when in the fully spooled state. When the either spool 32, 34 is between the fully spooled and unspooled states (e.g., the mid-state), the respective spool 32, 34 is axially spaced from the housing 30.

Referring back to FIG. 1 and more specific to the application of the body 22 being an armrest and the body 24 being a center console, the center console 24 may be constructed to move linearly in forward and rearward directions (see arrows 48, 50 with respect to the stationary structure 26. The armrest 22 may be constructed to move linearly in the forward direction 48 and in the rearward direction 50 with respect to the center console 24. Generally, the system 20 enables the ability to move, for example, the center console 24 in the forward direction 48 while the armrest 22 maintains a present position, or the armrest 22 may move with the center console 24.

To assist in explanation, FIG. 1 depicts the body 22 (e.g., armrest), and body 24 (e.g., center console) in positions associated with the respective spools 32, 34 in the fully spooled states with respective cables 38, 40 retracted. If an occupant desires to move the body 24 (e.g., center console) in the forward direction 48, the occupant may generally push upon the body 24 causing the spool 34 to begin unspooling thus extending the cable 40. This motion may continue until a maximum distance (see arrow 60) is reached signifying axial contact of the spools 32, 34 with spool 34 in the fully unspooled state. During this motion, the body 24 moves the distance 60 with respect to the body 26, and the body 22 (e.g., armrest) remains with the body 24 (i.e., does not move with respect to body 24). This same operating scenario may occur vice-versa (i.e., moving the body 22 in the forward direction but not the body 24. After moving either one of the bodies 22, 24 forward by the maximum distance 60, the other body may not be moved further forward because the spools 32, 34 are in axial contact. In one scenario or application, this movement restriction may prevent any one of the bodies 22, 24 from undesirably contacting a vehicle dash 62.

In another operating scenario, an occupant may desire to move the body 24 (e.g., center console) to about the mid-state in the forward direction 48 (i.e., about half the distance 60). The occupant may generally push upon the body 24 causing the spool 34 to begin unspooling thus extending the cable 40. This motion may continue until about half the maximum distance 60 is reached signifying the spool 34 is in about the mid-state. At this point, the body 22 has moved with the body 24, and the associated spool 32 has yet to unspool from the fully spooled state. If the occupant now desires to move the body 22 forward, the occupant may do so, but only by about half the distance 60, which would signify axial contact of the spools 32, 34 since they would both be in the respective mid-states. In all operating scenarios, the torsion spring 36 assists in returning the spools 32, 34 to the fully spooled state and the associated body positions while maintaining a degree of tautness in the cables 38, 40.

Figure 4:
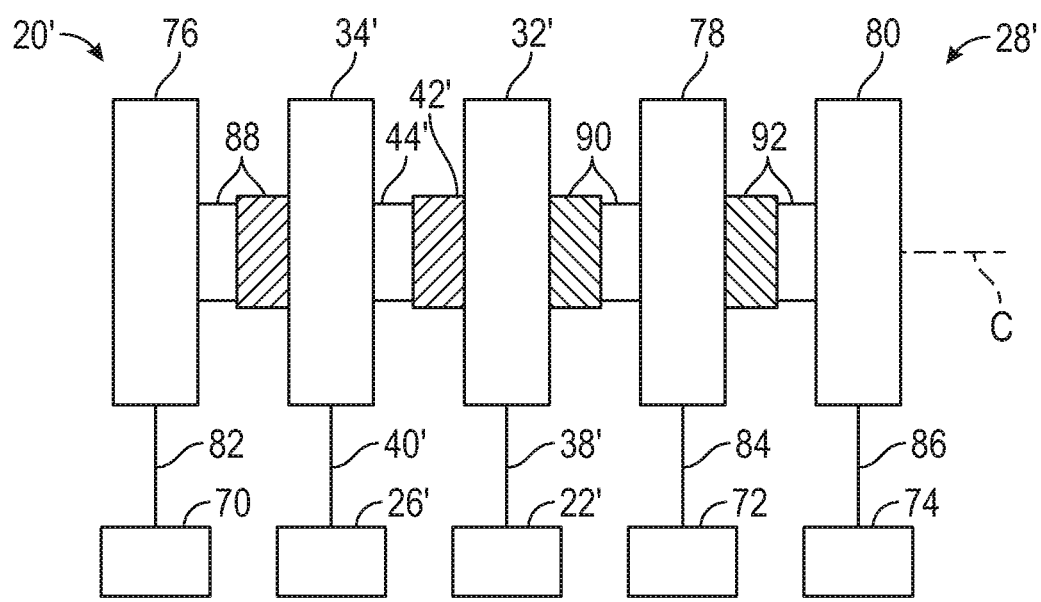
FIG. 4 is a schematic of a second embodiment of an articulating multi-body system.

Referring to FIG. 4, a second embodiment of an articulating multi-body system is illustrated wherein like elements to the first embodiment have like identifying numerals except for the addition of a prime symbol suffix. An articulating multi-body system 20' includes a multitude of bodies (i.e., five illustrated as 22', 26' 70, 72, 74) and a displacement clutch 28'. The displacement clutch includes a multitude of spools (i.e., five illustrated as 32', 34', 76, 78, 80), and a multitude of cables (i.e., five illustrated as 38', 40', 82, 84, 86). The cables 38', 40', 82, 84, 86 extend between, and are connected to, the respective bodies 22', 26', 70, 72, 74 and the respective spools 32', 34', 76, 78, 80.

When fully assembled, the spools 32', 34', 76, 78, 80 are adapted to rotate about a common centerline "C" with spool 32' located axially between spools 34', 78, with spool 34' located axially between spools 76, 32', and with spool 78 located axially between spools 32', 80. Spool 76 is rotationally connected to spool 34' via threads 88 carried between the spools. Spool 34' is rotationally connected to spool 32' via threads 44', 42' carried between the spools. Spool 78 is rotationally connected to spool 32' via threads 90 carried between the spools. Spool 80 is rotationally connected to spool 78 via threads 92 carried between the spools.

In one embodiment, the threads 88, 44', 42' may be left-handed threads and the threads 90, 92 may be right-handed threads, or vice-versa. Alternative thread arrangements may be achieved with spools having equal or unequal diameters to articulate a grouping of bodies as desired.

The system 20 may be applied to other applications where multiple bodies must have a displacement that is controlled by the displacement of another body. In one example, if an actuator must pull on two separate latches or cables with different strokes, the clutch may pull both using only one actuator. The thread pitch and spool diameter may be set such that when the actuator starts pulling, the actuator only pulls on the first cable for the first pre-defined distance, then the spools will lock causing the actuator to start pulling on the second cable.

Advantages and benefits of the present disclosure include the reduction of parts, such as the number of cables, and the reduction of bare cable exposure. Other advantages include a more robust system that is simpler to maintain and/or repair.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:
1. An articulating multi-body system comprising:
   a first body;
   a second body;
   a third body; and
   a displacement clutch mounted to the second body, the displacement clutch including;
      a first spool including first threads centered about a centerline, wherein the first spool is adapted to rotate about the centerline between a fully spooled state, a mid-state, and an unspooled state,
      a second spool including second threads centered about the centerline and operably threaded to the first threads for axial displacement with respect to the first spool, wherein the second spool is adapted to rotate about the centerline between a fully spooled state, a mid-state, and an unspooled state;
      a first cable extending between and connected to the first body and the first spool, wherein the first cable is adapted to spool about the first spool; and a second cable extending between and connected to the third body and the second spool, wherein the second cable is adapted to spool about the second spool, wherein a maximum axial distance exists between the first and second spools when the first and second spools are in the fully spooled states, and the first and second spools make axial contact with one-another when one of the first and second spools in the fully spooled state and the other of the first and second spools is in the unspooled state.

2. The articulating multi-body system set forth in claim 1, wherein the displacement clutch includes a torsion spring connected to the first and second spools, wherein the torsion spring is in a fully torqued condition when the first and second spools are in axial contact, and is in a fully relaxed condition when the first and second spools are spaced at the maximum axial distance.

3. The articulating multi-body system set forth in claim 2, wherein the first body is an armrest, the second body is a console, and the third body is a stationary structure.

4. The articulating multi-body system set forth in claim 1, wherein the first body is an armrest, the second body is a console, and the third body is a stationary structure.

5. The articulating multi-body system set forth in claim 1, wherein the first and second spools are in axial contact with one-another when the first and second spools are in the mid-states.

6. The articulating multi-body system set forth in claim 1, wherein the first cable is fully extended when the first spool is in the unspooled state, and the second cable is fully extended when the second spool is in the unspooled state.

7. The articulating multi-body system set forth in claim 1, wherein the first threads are female threads and the second threads are male threads.

8. The articulating multi-body system set forth in claim 1, further comprising:
a fourth body, wherein the displacement clutch includes a third spool including third threads centered about the centerline and operably threaded to one of the first and second spools for axial displacement with respect to the one of the first and second spools, wherein the third spool is adapted to rotate about the centerline between a fully spooled state, a mid-state, and an unspooled state, and a third cable extending between and connected to the fourth body and the third spool, and the third cable being adapted to spool about the third spool.

9. The articulating multi-body system set forth in claim 8, wherein the second spool is disposed axially between the first and third spools.

10. The articulating multi-body system set forth in claim 9, wherein the first and second threads are left-handed threads and the third threads are right-handed threads.

11. A displacement clutch adapted to control motion between first, second, and third bodies, the displacement clutch comprising:
a first spool adapted to be rotationally engaged to the second body, the first spool including first threads centered about a centerline, wherein the first spool is adapted to rotate about the centerline between a fully spooled state, a mid-state, and an unspooled state;
a second spool adapted to be rotationally engaged to the second body, the second spool including second threads centered about the centerline and operably threaded to the first threads for axial displacement with respect to the first spool, wherein the second spool is adapted to rotate about the centerline between a fully spooled state, a mid-state, and an unspooled state;
a first cable extending between and connected to the first body and the first spool, wherein the first cable is adapted to spool about the first spool; and
a second cable extending between and connected to the third body and the second spool, wherein the second cable is adapted to spool about the second spool, wherein a maximum axial distance exists between the first and second spools when the first and second spools are in the fully spooled states, and the first and second spools make axial contact with one-another when one of the first and second spools in the fully spooled state and the other of the first and second spools is in the unspooled state.

12. The displacement clutch set forth in claim 11, wherein the first and second spools are in axial contact with one-another when the first and second spools are in the mid-states.

13. The displacement clutch set forth in claim 12, further comprising:
a torsion spring connected to the first and second spools, wherein the torsion spring is in a maximum torqued condition when one of the first and second spools are in axial contact.

14. The displacement clutch set forth in claim 13, wherein the first cable is fully extended when the first spool is in the unspooled state, and the second cable is fully extended when the second spool is in the unspooled state.

15. The displacement clutch set forth in claim 11, wherein the first threads are female threads and the second threads are male threads.

16. The displacement clutch set forth in claim 11, further comprising:
a third spool including third threads centered about the centerline and operably threaded to one of the first and second spools for axial displacement with respect to the one of the first and second spools, wherein the third spool is adapted to rotate about the centerline between a fully spooled state, a mid-state, and an unspooled state; and
a third cable extending between and connected to a fourth body and the third spool, wherein the third cable is adapted to spool about the third spool.

17. The displacement clutch set forth in claim 16, wherein the second spool is disposed axially between the first and third spools.

18. The displacement clutch set forth in claim 16, wherein the first and second threads are left-handed threads and the third threads are right-handed threads.

* * * * *